March 29, 1966 — J. M. HENLEY — 3,242,669
HYDRAULIC HEAD PULLER ASSEMBLY
Filed Aug. 31, 1964
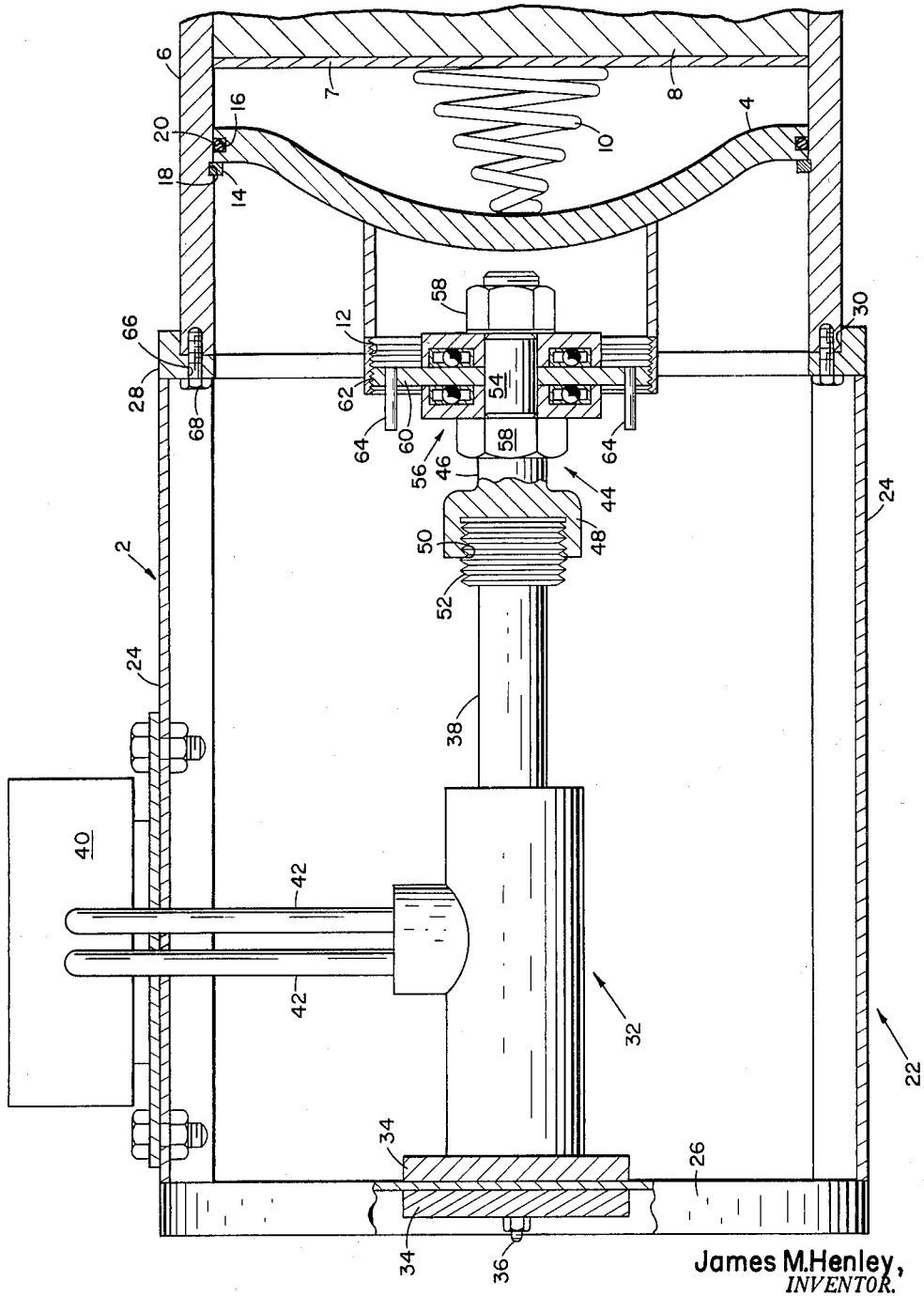
James M. Henley,
INVENTOR.
BY Harry M. Saragovitz
Edward J. Kelly
Herbert Berl
J. Keith Fowler
ATTORNEYS United States Patent Office 3,242,669
Patented Mar. 29, 1966

3,242,669
HYDRAULIC HEAD PULLER ASSEMBLY
James M. Henley, Huntsville, Ala., assignor to the United States of America as represented by the Secretary of the Army
Filed Aug. 31, 1964, Ser. No. 393,459
6 Claims. (Cl. 60—35.6)

The invention described herein may be manufactured and used by or for the Government for governmental purposes without the payment of any royalty thereon.

This invention relates to facile assembly and/or disassembly of rocket motors and more particularly to an improved device for assembly and disassembly of head closures of rocket motor casings, booster casings and the like.

In double-base propellant rocket motor casings, a head closure plate is normally retained in place within the after end of the casing by a retainer ring. This closure plate is required to allow initial assembly and subsequent disassembly for inspection purposes. Interposed in the space between the inner face of the closure head and the propellant body is a heavy compression spring which continuously biases the closure plate against the retainer ring. Assembly and disassembly of the closure head with the casing has become a hazardous operation because of the tremendous force of the compression spring on the closure head, which force must be overcome in assembly and disassembly in order to, respectively, insert or remove the retainer ring. Further, during transport of rocket motors, an additional force may result from propellant gases which have developed within the space between the head closure and propellant body.

To assure uniformity and safety in firing rocket motors of the type described, it is highly important that the propellant body be properly positioned and oriented in its casing prior to firing. Thus, for this reason, inspections are required both periodically and immediately prior to firing. To make these inspections or to assemble the rocket motor, removal and insertion of the closure head is required.

Accordingly, the principal object of the invention is to provide a head puller assembly capable of inserting and/or removing a head closure plate with respect to a rocket motor casing while maintaining the head in concentric alignment with the bore of the casing during axial sliding movement therein.

A further object of the invention is to provide a closure head puller and/or inserter attachment device which is adapted for connection with the extended end of the piston rod of a conventional, double-acting, hydraulic, cylinder-piston type jack.

An important feature of the invention is to provide, for an hydraulic head puller apparatus, a removable support frame which is adapted to be positioned contiguous a casing end opening, which occupies the minimum of space, and which is capable of being readily adjustable for use with varying diameter casings.

A further feature of the invention resides in the provision of a head closure puller and/or inserter assembly which has relatively few parts, is economical to manufacture and is readily attachable to a motor casing or the like, for pulling and/or inserting closure heads therein.

A still further feature of the present invention is to provide a puller and/or inserter assembly for use with a double-acting, hydraulic motor wherein no changes or modifications are required when switching from a pulling operation to an inserting operation, or vice versa.

The specific nature of the invention as well as other attendant objects and advantages thereof will clearly appear from a description of the invention as shown in the accompanying drawing in which:

The single figure is a fragmentary, sectional, elevation view of a head closure puller and/or inserter assembly, embodying the features of the present invention and shown in operative position with respect to a rocket motor casing and connected with the end closure thereof.

As shown in the drawing, reference numeral 2 generally designates a head puller and inserter assembly for pulling and/or inserting closure head or plate 4 into the after end of a motor casing, shown partially at 6. The motor casing contains a solid propellant body 8 (shown fragmentarily), the after end of which is confined axially, as by a circular retainer plate 7. A large, coil, sustainer spring 10 is interposed between the forward face of the closure plate, which is normally dome-shaped as shown, and the propellant retainer plate 7. The primary function of spring 10 is to minimize vibrations in the motor during transit and in handling.

To secure the closure plate in its operative position in the after end of the motor casing, a retainer ring 14 is snapped into a circumferential groove 18 provided on the inner, cylindrical surface or bore of the casing subsequent to moving the closure plate axially forward and clear of said groove. As depicted in the drawing figure, ring 14 prevents axial movement of the closure head outwardly of the casing.

In order to effect a seal between closure head 4 and motor casing 6 for sealing the propellant body, an annular groove 16 is provided in the outer periphery of closure head 4 to receive therein a seal 20, which may be any of the conventional "O-ring" types. This pressure seal is necessary to prevent gas leak and probable case failure during propellant burning.

Closure head 4 is normally provided on its outer surface (remote from the propellant body) with an internally threaded extension 12.

Head puller assembly 2 comprises a U-shaped supporting frame 22, preferably made of channel members, including parallel longitudinally extending, leg portions 24 defining an open end and transversely extending base portion 26 defining a closed end. A motor adapter ring 28 is carried by the free ends of leg portions 24 in any convenient manner. The forwardly facing surface of ring 28 is formed with a counterbored portion 30 for receiving the tubular end wall of motor casing 6 to define an abutment means for the head puller assembly when positioned for operation therewith.

A double-acting, hydraulic jack cylinder 32 extends between legs 24 of the frame forwardly from base 26 of the frame toward the end of the motor casing. The after end of cylinder 32 is secured to base 26 by support plates 34 and bolt means 36. Clyinder 32 is provided with the usual bore (not shown) in which a piston (not shown) is slidably mounted, said piston having a piston rod 38 extending axially outwardly of the cylinder toward the adapter ring 28.

Reference numeral 40 designates a conventional hand pump (shown schematically) secured to the support frame as one means for actuating the hydraulic jack as through the usual fluid connections 42. It is to be understood, however, that any other suitable arrangement may be provided for supplying fluid pressure to the jack for actuating the same.

To adapt the forward end (remote from cylinder 32) of piston rod 38 for connection with closure head 4, an attachment means 44 is provided. The attachment means comprises, a bearing shaft 46 having an enlarged, after end 48 which has an internally threaded counterbore 50 adapted for direct connection with a mating, enlarged, threaded end 52 of piston rod 38. A reduced, forward end 54 of the bearing shaft supports a thrust bearing unit 56. Bearing unit 56 is secured on reduced end 54 of the bearing shaft between a pair of lock nuts 58. Rotatably mounted on shaft end portion 54 and positioned centrally of the bearing unit is a circular head closure adapter plate 60 which is threaded on its periphery, as at 62, for engagement within the threaded tubular extension 12 in the closure head.

Means 64, in the form of pins, are provided in circumferentially spaced relationship on plate 60 for selective rotation of the plate for the threaded engagement thereof with tubular extension 12.

When the hydraulic head pulling assembly 2 is to be used for pulling closure head 4 from motor casing 6, motor adapter ring 28 is positioned securely on the end of the casing while support frame 22 is supported by any suitable means. Frame 22 could be supported, for example, by providing upright legs for portion 24 if desired. A plurality of apertures 66 are provided in adapter ring 28 for securement to the end of the casing as by bolt heads 68.

Upon fluid pressure actuation of the hydraulic jack, the piston rod is moved axially to move the circular adapter plate 60, which is carried therewith, into engagement tubular extension 12 of closure head 4. Since the jack cylinder is fixed to frame base portion 26, as at 34, 36, so as to be disposed in co-axial alignment with the motor casing, the head closure and tubular extension 12, the piston rod will move plate 60 into so-axial alignment with the extension. The peripherally threaded plate 60 is then rotated, as by means 64, in a clockwise manner to effect screw-threaded engagement with internally threaded tubular extension 12.

To effect removal of closure head 4, jack 32 is initially actuated to move piston rod 38 and closure head 4, which is connected directly therewith, axially inwardly of the motor casing against the effect of heavy compression spring 10 to the extent that snap ring 14 may be removed manually from groove 18. Further actuation of the hydraulic jack to move the piston rod in the opposite direction, i.e. axially outwardly of the motor casing, toward the jack cylinder will cause the closure head to be removed axially from the motor casing.

In operation of the device to insert a closure head into a motor casing, it is apparent that the piston rod and closure head are connected in the same manner as set forth hereinabove. After compression spring 10 is inserted in the casing against propellant body retainer plate 7, the hydraulic jack is actuated, as by usual means, to move piston rod 38 and closure head 4 carried thereby, axially into the motor casing against the action of spring 10. The closure head is, thus, moved to an axial extent beyond snap ring groove 18 so that snap ring 14 is allowed to be seated in said groove. After the snap ring is seated in the groove, the jack piston rod is moved in the opposite direction, as by usual means of actuation. The closure head will be moved, simultaneuosly, in a direction outwardly of the motor casing by the force of spring 10 to an axial extent limited by engagement with snap ring 14. The closure head, thus, being in operable, engaged position, plate 60 is then rotated, as by means 64, in a counter-clockwise direction to disengage its threaded engagement with tubular extension 12 of the closure head. The puller assembly may then be removed from the motor casing by releasing the attachment, as by bolts 68, of frame 22 and casing 6.

It is believed to be obvious that element 26 of the support frame could be shortened or lengthened and that motor adapter rings of different sizes could be utilized to adapt the head puller assembly of the invention for use with motor casings of different sizes. Further, it is believed obvious that different size plates 60 could be used to cooperate with the particular size tubular extension of a closure head with which the assembly is used.

From the foregoing it is clearly apparent that there is provided herein an hydraulic head puller assembly which may be used to pull and/or insert closure heads in rocket motor casings or the like without any alterations being required for the pulling or inserting operations. Also provided is an hydraulic head puller assembly which is simple to manufacture, highly efficient in operation, safe to operate and capable of use for quickly removing or inserting head closure plates in cylindrical casings.

It is to be understood that the specific embodiment of the invention described is merely illustrative of the principles of the invention and that various changes and modifications may be made without departing from the spirit and scope of the invention as set forth in the appended claims.

I claim:

1. Apparatus for inserting a circular end closure plate into engaged position within the after end of a cylindrical casing against the action of a powerful, compression spring, wherein the closure plate must be moved axially inwardly of said after end against the effect of said spring to an extent to allow a retainer ring to be positioned within a groove in the bore of said casing to prevent movement of said plate axially outwardly of said after end of the casing, comprising: a support frame adapted to be positioned in fixed relationship on the after end of the casing, an hydraulic jack carried by said frame and having a piston rod extending axially toward and co-axially with said after end of the casing, means carried by the forward end of said piston rod for attaching said rod to the closure plate at the central portion thereof, and means for actuating said jack whereby the closure plate is moved axially inwardly of said after end of the casing against the action of said spring to an extent to allow the retainer ring to be positioned within said groove in the casing bore to prevent movement of said plate axially outwardly of said casing after end.

2. The apparatus set forth in claim 1, wherein the end closure plate is provided with an internally threaded tubular extension, and wherein the means for attaching the piston rod to the closure plate includes a thrust bearing unit having a bearing shaft connected at its after end to the forward end of the piston rod, and an externally threaded adapter plate rotatably mounted centrally of said bearing unit and adapted for mating engagement with said internally threaded tubular extension of the closure plate.

3. An hydraulic head puller for pulling a head closure from its secured position within an end of a casing comprising: a substantially U-shaped frame defined by a base portion and a pair of parallel legs extending normal thereto, said frame being disposed in co-axial alignment with the casing; a cylindrical adapter ring carried by the terminal portions of said legs for abuttingly engaging said end of the casing; an hydraulic motor including a cylinder means fixed at one end thereof to said base portion of the frame, a piston disposed for movement axially in said cylinder means, and a piston rod connected with said piston and extending axially outwardly from the other end thereof between the legs of said frame; a thrust bearing unit carried by the outer, extended end of the piston rod, said bearing unit including an adapter plate disposed centrally thereof, said adapter plate being disposed concentrically with said cylindrical adapter ring, means provided on the periphery of said adapter plate for connecting the same to said closure plate; and means for actuating said motor for movement of said piston in a direction away from said closure plate for withdrawal of the closure plate from the casing.

4. A puller attachment adapted for connection with the extended end of a piston rod of an hydraulic cylinder-piston jack for use in pulling a spring-loaded closure head having a threaded bore on its external face from securement with its casing, said attachment comprising: a bearing shaft; means provided on one end of said shaft for connection with said piston rod end; thrust bearing means carried by the other end of said bearing shaft; an adapter plate rotatably mounted centrally of said bearing means, the outer periphery of said adapter plate being threaded for mating engagement with said threaded bore in the closure plate.

5. In combination with a rocket motor of the type having a casing, a solid propellant body disposed in the after end of said casing, an end closure member, an annular groove in the inner, cylindrical surface of said casing and a snap ring disposed in said groove for retaining said end closure securely within said after end of the casing, a sustainer spring disposed between the propellant body and said end closure member for maintaining a force on the closure member in a direction axially outwardly of the casing, a threaded tubular extension provided on the outer face of the end closure member on the axis thereof; a puller assembly for withdrawing the end closure member comprising: a U-shaped frame; an adapter ring carried by the open end of said frame and having a recessed portion whereby said ring provides an abutment for the assembly when said after end of the casing is received therein; a double-acting, hydraulic motor including a cylinder fixed at one end to the other end of said frame and a piston rod having a forward end extending from the other end of the cylinder; means for connecting said forward end of the piston rod with the end closure member, said means comprising a bearing shaft one end of which is adapted to be secured to said forward end of the piston rod, a thrust bearing assembly rotatably supported on the other end of said bearing shaft, a circular, externally threaded plate rotatably mounted centrally of said bearing assembly and adapted to be received in said threaded extension thereby providing a direct connection of the forward end of the piston rod and the end closure member; and means for actuating said hydraulic motor to effect movement of said end closure member axially inwardly of said casing against the action of said spring whereby the retainer ring may be removed to allow the closure member to be removed axially outwardly thereof.

6. In combination with a rocket motor including a cylindrical casing having a fore and after end, a solid propellant body disposed within the after end of said casing, a circular retainer plate disposed within the casing axially inwardly of the after end thereof for confining the after end of the propellant body, a circular closure head disposed within the casing axially outwardly of said retainer plate and defining an axial space therebetween, a retainer ring positively positioned in the internal surface of said casing to provide a limit means for preventing axial movement of said closure head axially outwardly of said casing, a powerful compression spring disposed within said space to continuously bias the closure head into engagement with said limit means, and an internally threaded, tubular extension carried by the outer surface of said closure head and extending co-axially thereof; an improved closure head puller assembly for removing the closure head from the motor casing comprising: a substantially U-shaped frame adapted to be disposed with the open end thereof contiguous the after end of the motor casing; a motor adapter ring carried by said open end of the frame and adapted for securement with said after end of the casing; a fluid actuated jack having a cylinder and a reciprocating piston rod, said cylinder being fixed at its after end to the base of said frame, said piston rod extending axially in the direction of the open end of said frame and being disposed in co-axial alignment with the after end of the motor casing and closure head when said puller assembly is positioned for operation on the end of said casing; attachment means carried by the forward end of said piston rod for mating engagement within said tubular extension; and means for actuating said jack to effect axial movement of the head closure in the direction to compress said spring so as to allow said retainer ring to be removed from its engaged position within the casing whereby the closure head is free to be moved in the opposite direction axially outwardly of said motor casing by said spring and said jack.

References Cited by the Examiner
UNITED STATES PATENTS

| | | | |
|---|---|---|---|
| 1,372,350 | 3/1921 | Hunn | 29—227 |
| 2,863,212 | 12/1958 | Peterson | 29—227 |
| 2,948,057 | 8/1960 | Dagenais | 254—10.5 |

MARK NEWMAN, *Primary Examiner.*

C. R. CROYLE, *Assistant Examiner.*